United States Patent Office 3,119,738
Patented Jan. 28, 1964

3,119,738
MEDICATION FOR RUMINANTS
Roy E. Nichols, Madison, Wis., assignor to Wisconsin Alumni Research Foundation, Madison, Wis., a corporation of Wisconsin
No Drawing. Filed Apr. 12, 1962, Ser. No. 186,850
4 Claims. (Cl. 167—53)

The present invention relates to a novel product and more specifically, a product adaptable for the uniform and slow release of a medicament in the rumen of ruminants. The product is of special value of the prophylaxis of bloat.

Bloat is the building up of gas pressure in the paunch of ruminants such as the cow, sheep and the like. A swelling in the left flank is usually the first obvious sign. The animal's eyes bulge, the animal becomes uneasy, it stops eating, and it may become frantic in its efforts to lessen the pressure of gas in its paunch. It can be fatal and has been recognized as a serious problem for many years. It has been estimated, for example, that bloat costs up to about one million dollars a week. This is a heavy tax for the consumer to pay for bloat, for it is, indeed, the consumer who finally pays the bill.

Various suggestions of possible causes of bloat as well as so-called "cures" have been made by previous investigators in this field. However, prior to the discoveries described in the copending Nichols application Serial No. 517,381, filed June 22, 1955, now Patent No. 3,074,846, and the discoveries leading to the present invention, no medicinal preparation has been experimentally proven to be of practical value in preventing or curing bloat. As a result, prior to this, when an animal was very badly bloated and showed no signs of recovering without help, the treatment indicated in most instances called for the insertion of a sharp instrument, preferably a trocar or canula, deep into the most swollen part of the left flank to let the gas escape. The disadvantages of this drastic treatment are apparent.

In early investigations it was discovered that surface-active agents such as the well-known alkyl aryl sulfonates, alone or in combination with materials such as lecithin, could be used to prevent or cure bloat. See the copending Nichols application, supra. The use of surface-active agents per se, however, posed problems of acceptability due to the objectionable taste of most surface-active agents and also due to limited retention of the surface-active agents, which are water-soluble, in the rumen.

In investigations in this field it was found that the production of gas ($CO_2$) during digestion of feed in the rumen of cattle is a normal process, indeed, a necessary part of digestion. It was also found that there was a rapid increase in gas production when the feed was made up largely of fresh young legumes, such as alfalfa, and that this frequently resulted in frothiness and the development of bloat. Increase in gas production was traced for the most part to the reaction of the soluble acids derived from the legmes with the bicarbonates present in the rumen fluid. This per se, however, did not explain the development of bloat, as gas by itself causes no difficulty unless something happens in the rumen to keep the cow from getting rid of the gas.

In continued investigations it was found that the pectin materials present in plant feed were converted by the enzyme pectin methylesterase (PME) to pectic acid, during digestion, and that this resulted in the jelling of the rumen fluid to make it more viscous, i.e. less fluid. As the fresh young legumes are a good source of the "jelling" enzyme (PME), bloat may develop during the feeding of legumes, as the legumes increase both the amount of gas and the viscosity of the rumen fluid. This results in the gas being trapped in the viscous rumen contents as foam, making it impossible for the cow to get rid of the gas by normal procedures, i.e. belching.

These findings led to the discovery that chemical inhibitors, which inhibit the activity of the enzyme pectin methylesterase (PME), e.g. alkyl aryl sulfonates which have been demonstrated to have this property, and specifically prevent the enzyme (PME) from increasing the viscosity of the ruminal contents, can be used to prevent bloat. These findings plus the finding that enzyme pectinase can convert pectic acid to galacturonic acid, led to the further discovery that the abnormal viscosity of the pectic acid-rumen juice, can be returned to normal by the administration of pectinase. Unlike the chemical inhibitor which controls the activity of the enzyme PME and prevents the development of the gel in the rumen contents, the enzyme pectinase breaks up the gel or removes the agent (pectic acid) responsible for gelling, as it is produced. With inhibition of the enzyme PME, the viscosity of the rumen contents remains normal and bloating is prevented.

These interesting discoveries still left a basic problem, noted above, unsolved, for materials which dissolve or mix with the rumen contents are flushed out of the organ (rumen) during its usual emptying process. As a result of this limited retention in the rumen, the duration of the effectiveness of a medicament which dissolves or mixes with the rumen contents is limited accordingly. With continued investigations it was discovered that materials with a density less than rumen fluid (which normally has a density of about 1.15), and which floats on the rumen fluid, are not flushed out of the organ but remain in the rumen for long periods of time. With this discovery plus the discoveries noted above, the product of the present invention which provides for the uniform and slow release of a medicament in the rumen over relatively long periods of time, was developed.

The product of the present invention consists essentially of an essentially inert, low density, adsorbent, granular material, preferably inorganic material, in particulate form having a medicament adsorbed thereon and having each particle coated with a water-insoluble, water-permeable coating. One of the preferred inorganic materials for use in the invention is heat expanded vermiculite (Verxite No. 4). This low density, laminar or porous material, in essence, acts as a matrix for the medicament. Porous clays such as attapulgite can also be used as the carrier for the medicament. For bloat, the preferred medicament is an alkyl aryl sulfonate surface-active agent and specifically mono-sodium dodecyl benzene sulfonate. To be sure the product will float on the rumen fluid, the density of the product is maintained at approximately no greater than 1, with a density slightly below that of water, e.g. at about 0.9, being preferred.

The medicament used in the present invention can be any medicament useful in the treatment of ruminants, where the uniformly slow release of the medicament in the rumen is desired. Examples include surface-active agents such as the well-known alkyl aryl sulfonates noted above, which are enzyme inhibitors and can be used as such for the prophylaxis or treatment of bloat. Anionic and nonionic detergents, generally, with or without lecithin or the like, can also be used. See copending Nichols application, supra. Enzymes per se, such as pectinase, which maintain the viscosity of the rumen fluid at its normal level can also be used. In addition, anthelmintics, such as phenothiazine, can be used where the uniform and slow release of the medicament in the rumen with passage on into the lower digestive tract is desired.

The coating should be of the water-insoluble, water-permeable type such as ethylcellulose, zein, cellulose acetate phthalate, etc. The preferred method of applying the coating is by the air-suspension process in which the particulate inorganic material with the adsorbed medicament is suspended in a moving air stream in fluidized bed form and the coating solution, in atomized form, is introduced into the air stream maintaining the particles in the fluidized bed. See Wurster Patent 2,648,609 and the copending Wurster application Serial No. 861,063, filed December 21, 1959. The organic water-insoluble, water-permeable film forming coating materials are preferably applied in volatile organic solvents such as mixtures of methylene chloride and isopropyl alcohol, mixtures of chloroform and ethyl alcohol, and the like. Coatings which are slowly digested in the rumen can be used.

The following examples will serve to illustrate the invention.

*Example I*

To about 100 ml. of water at about 55–60° C. is first added, with stirring, about 37.3 grams of monosodium dodecyl benzene sulfonate. To the resulting solution, maintained at 55–60° C., is next added about 27 grams of heat expanded vermiculite (40 mesh). The mixture is then stirred and the resulting paste-like product is air dried in thin layers with a little heat being applied to drive off the last traces of moisture.

The resulting dry granular product which contains about 60° surface-active agent, is finally coated by the Wurster air-suspension method described above. In this operation, the dry particles are suspended in a moving air stream in fluidized bed form and are coated by introducing into the air stream an atomized solution made up of 4 grams of ethyl cellulose dissolved in 80 cc. of a solvent consisting of about equal parts/volume of methylene chloride and isopropyl alcohol. The resulting product containing about 6% by weight of coating is lighter than ruminal fluid, i.e. it floats in the fluid, and is of a preferred type.

*Example II*

This example is in accordance with Example I, except that the suspended vermiculite particles with the adsorbed surface-active agent are coated with zein by introducing an aqueous (10%) isopropyl alcohol solution of zein into the air stream prior to its contact with the suspended particles.

The use of low density, granular inorganic material as the carrier for the medicament, as noted above, is preferred. Organic material such as ground corn cobs, oat and wheat chaff, cropped straw and the like can also be used as the carrier. While these materials, unlike vermiculite, are digestible in the rumen, they are protected by the water-insoluble coating and remain essentially inert for long periods of time.

The water-insoluble, water-permeable coating on the products in all cases is a thin coating, e.g. from about 2% up to about 10% by weight of the product, with the thinner coatings releasing the medicament more rapidly than the thicker coatings. Equivalent coatings such as relatively thick water-permeable films of water-soluble material, e.g. methyl cellulose, which dissolves slowly in the rumen can also be used. Optimum conditions including dosage for a particular product can be readily ascertained by preliminary test. The coatings in all cases have been found adequate to make products with objectionable tasting, e.g. bitter, medicaments readily acceptable to the ruminants. An illustrative example of a dosage unit for bloat, is 10 grams of the product of Example I (which contains 6 grams of the alkyl aryl sulfonate) mixed with one pound of feed. The products of the present invention can also be pelletized with feed, e.g. soybean meal, and the resulting pellets administered by blending with feed supplements, grain rations, etc.

I claim:

1. A product adaptable for the uniform and slow release of a medicament in the rumen of a ruminant, consisting essentially of an essentially inert, low density, adsorbent, granular carrier, in particulate form with a medicament absorbed thereon, and covered with a water-insoluble, water-permeable external coating, said product being of low density of up to 1.0 and characterized by its ability to float in rumen fluid in the rumen.

2. The product of claim 1, where the carrier is heat expanded vermiculite.

3. The product of claim 2 where the medicament is monosodium dodecyl benzene sulfonate.

4. The product of claim 3, where the coating is ethyl cellulose and the product has a density of about 0.9.

References Cited in the file of this patent

UNITED STATES PATENTS 2,540,979     Clymer _____ Feb. 6, 1951